US011320974B2

(12) United States Patent
Thunström et al.

(10) Patent No.: US 11,320,974 B2
(45) Date of Patent: May 3, 2022

(54) METHOD, COMPUTER PROGRAM PRODUCT AND PROCESSING CIRCUITRY FOR PRE-PROCESSING VISUALIZABLE DATA

(71) Applicant: Tobii AB, Danderyd (SE)

(72) Inventors: Robin Thunström, Danderyd (SE); Staffan Widegarn Åhlvik, Danderyd (SE)

(73) Assignee: Tobii AB, Danderyd (SE)

( * ) Notice: Subject to any disclaimer, the term of this patent is extended or adjusted under 35 U.S.C. 154(b) by 0 days.

(21) Appl. No.: 17/219,375

(22) Filed: Mar. 31, 2021

(65) Prior Publication Data

US 2021/0349607 A1    Nov. 11, 2021

(30) Foreign Application Priority Data

Mar. 31, 2020    (SE) .................................. 2030113-1

(51) Int. Cl.
| | |
|---|---|
| G06F 3/0484 | (2013.01) |
| G06F 3/04842 | (2022.01) |
| G06T 7/73 | (2017.01) |
| G06F 3/01 | (2006.01) |
| G06F 3/04815 | (2022.01) |
| G06F 3/0488 | (2022.01) |
| G06T 7/60 | (2017.01) |

(52) U.S. Cl.
CPC .......... G06F 3/04842 (2013.01); G06F 3/013 (2013.01); G06F 3/0488 (2013.01); G06F 3/04815 (2013.01); G06T 7/60 (2013.01); G06T 7/73 (2017.01); *G06T 2200/24* (2013.01)

(58) Field of Classification Search
CPC .. G06F 3/04842; G06F 3/013; G06F 3/04815; G06F 3/0488; G06T 7/73; G06T 7/60; G06T 2200/24
See application file for complete search history.

(56) References Cited

U.S. PATENT DOCUMENTS

| | | | | |
|---|---|---|---|---|
| 9,619,020 | B2* | 4/2017 | George-Svahn | ........ G06F 3/012 |
| 9,829,973 | B2* | 11/2017 | Vennstrom | .............. G06F 3/013 |
| 9,829,976 | B2* | 11/2017 | Algotsson | ........... G06F 3/04815 |
| 10,025,381 | B2* | 7/2018 | Cederlund | ............. G02B 27/01 |
| 10,545,574 | B2* | 1/2020 | George-Svahn | .......... G06F 3/02 |
| 10,607,401 | B2* | 3/2020 | Lindh | ..................... G06F 3/013 |
| 2014/0247210 | A1* | 9/2014 | Henderek | ............... G06F 3/041 |
| | | | | 345/156 |

(Continued)

*Primary Examiner* — Shen Shiau
(74) *Attorney, Agent, or Firm* — Samuel I. Yamron

(57) ABSTRACT

Visualizable data are obtained that represent a scene with at least one object. The visualizable data describe the scene as seen from a position. First and second measures are determined, which represent extensions of one of the objects in a smallest and a largest dimension respectively. An object aspect ratio is calculated that represents a relationship between the first and second measures. Based on the object aspect ratio, a selection margin is assigned to the object. The selection margin designates a zone outside of the object within which zone the object is validly selectable for manipulation in addition to an area of the object shown towards a view thereof as seen from the position. Thus, it is made easier to manipulatable the visualizable data in response to user input, for instance in the form of gaze-based selection commands.

13 Claims, 3 Drawing Sheets

(56) References Cited

U.S. PATENT DOCUMENTS

| | | | |
|---|---|---|---|
| 2015/0130740 A1* | 5/2015 | Cederlund | G02B 27/017 |
| | | | 345/173 |
| 2017/0177079 A1* | 6/2017 | George-Svahn | G06F 3/0227 |
| 2017/0364150 A1* | 12/2017 | Lovtjarn | G06F 3/005 |
| 2018/0300943 A1* | 10/2018 | Lindh | G06F 3/011 |
| 2019/0138740 A1* | 5/2019 | Ricknas | G06F 3/04842 |
| 2019/0253700 A1* | 8/2019 | Torneus | G06T 7/80 |
| 2020/0192472 A1* | 6/2020 | Lovtjarn | G06T 7/20 |
| 2020/0257360 A1* | 8/2020 | Klingstrom | G06T 19/00 |
| 2021/0287443 A1* | 9/2021 | Pateriya | G06K 9/3233 |

* cited by examiner

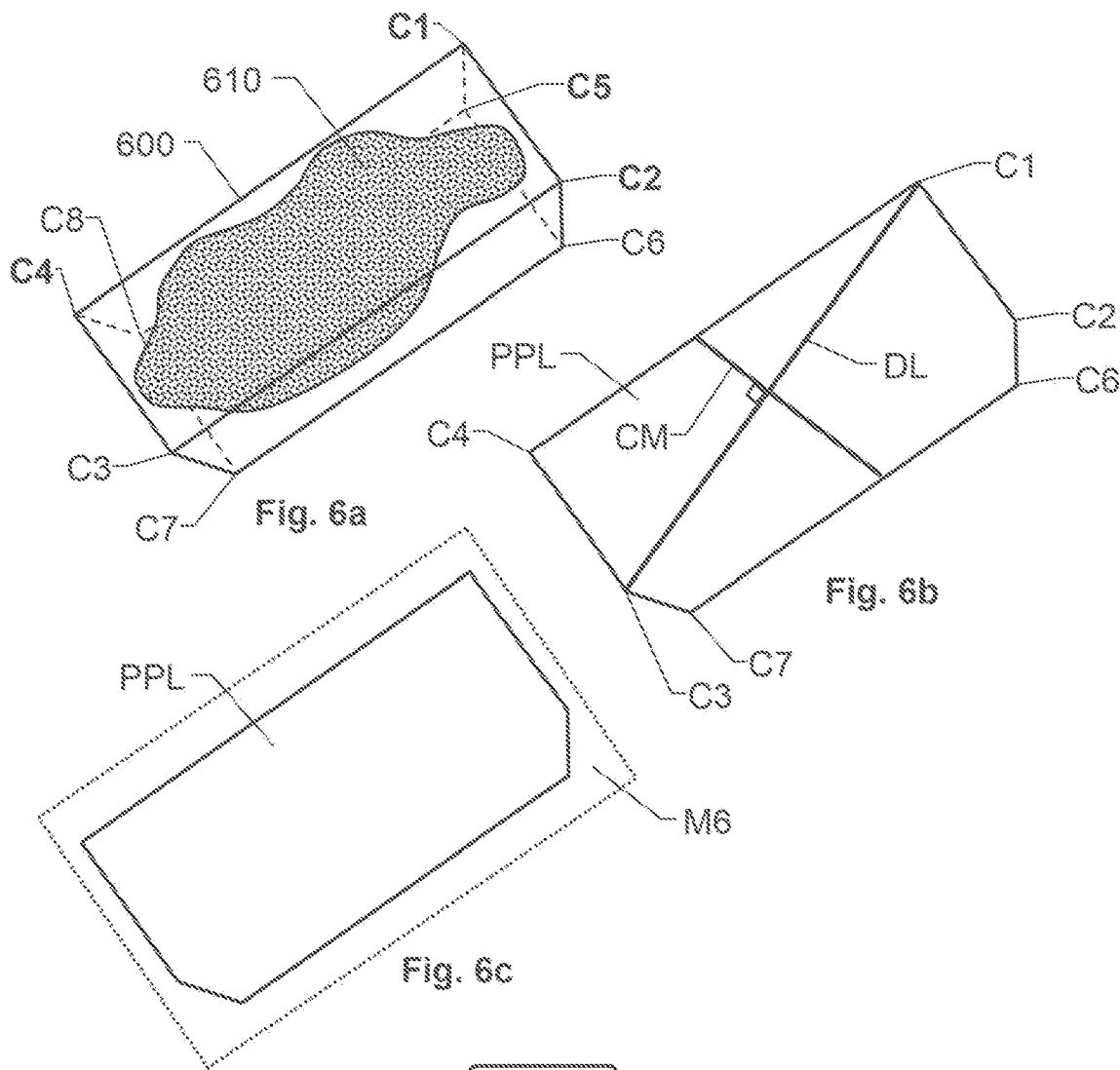
Fig. 6a
Fig. 6b
Fig. 6c
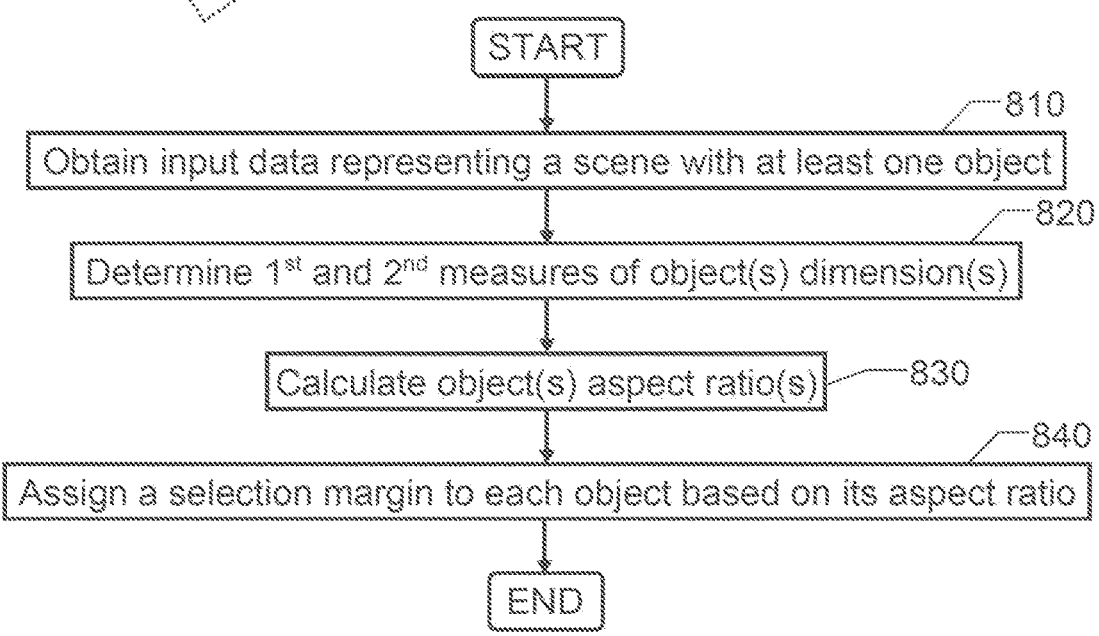
Fig. 8

METHOD, COMPUTER PROGRAM PRODUCT AND PROCESSING CIRCUITRY FOR PRE-PROCESSING VISUALIZABLE DATA

CROSS-REFERENCE TO RELATED APPLICATION

The present application claims benefit to Swedish patent application No. 2030113-1, filed Mar. 31, 2020, entitled "Method, Computer Program Product and Processing Circuitry for Pre-Processing Visualizable Data", and is hereby incorporated by reference in its entirety.

TECHNICAL FIELD

The invention relates generally to manipulation of visualizable data on a user-friendly format. In particular, the instant invention concerns a method for pre-processing visualizable data to be manipulatable in response to user input, and a processing circuitry configured to implement such a method. The invention also relates to a computer program product and a non-volatile data carrier.

BACKGROUND

Depending on the conditions, it can be a relatively complex task to determine which object in a group of potentially selectable objects that a subject intends to select, or by other means manipulate. Especially, this may be true if the selection is made based on the subject's gaze. However, similar problems may also arise in scenarios where the selection is made by other input means, for example via a hand-controlled cursor or on a touchscreen. Namely, the intended object may be obscured by other objects, by the subject's own finger and/or the intended object may be oriented relative to the subject in such a manner that the object shows a very small surface towards the subject's viewpoint. Of course, the selection process can be further complicated by the fact that the composition of the scene containing the object to be selected varies over time so that it becomes motorically difficult for the subject to indicate the intended object correctly.

U.S. Pat. No. 9,829,973 describes a solution for identifying an interaction element from one or more interaction elements present in a user interface. Gaze information is received from an eye tracking system; the likelihood is determined that an interaction element is the subject of the gaze information from the eye tracking system; and an interaction element is identified from the one or more interaction elements based on said likelihood determination.

WO 2016/193394 discloses a method for determining if a user's gaze is directed in the direction of a zone of interest in a 3D scene. The method involves providing a 3D scene containing a zone of interest; associating a property with the zone of interest and creating a bitmap representing the location of the zone of interest in a projected view of the 3D scene. Here, each pixel of the bitmap to which the zone of interest is projected stores the property of the zone of interest. The direction of the user's gaze is detected, and the bitmap is used to determine if the detected user's gaze is directed in the direction of the zone of interest.

The above documents exemplify how users may interact efficiently with digital visual elements in a gaze-based manner. However, still, problems remain to be solved, especially when pinpointing objects that are challenging to select due to their size, shape and/or dimensional relationship with any neighboring objects.

SUMMARY

It is therefore an object of the present invention to offer an improved solution for facilitating user interaction with visualizable data, for example in the form of 3D images, or computer graphics.

According to one aspect of the invention, this object is achieved by a method performed in at least one processor for pre-processing visualizable data to be manipulatable in response to user input. The method involves obtaining visualizable data representing a scene including at least one object. Here, the visualizable data describes the scene as seen from a position, for instance represented by a virtual camera position or the location from which an image of the scene was shot. First and second measures are determined representing extensions of the object in a smallest and larges dimension respectively as seen from the position. An object aspect ratio is calculated representing a relationship between the first and second measures. Based on the object aspect ratio, a selection margin is assigned to the object. The selection margin designates a zone outside of the object within which zone the object is validly selectable for manipulation in addition to an area of the object shown towards a view thereof as seen from the position in question.

This method is advantageous because it facilitates user interaction with objects in a scene regardless of which selection technique that is applied. However, the method is especially beneficial for gaze-based selection and where the object to be selected has a relatively large aspect ratio, i.e. a substantial difference between its largest and smallest dimensions.

According to one embodiment of this aspect of the invention, the determining of the first and second measures involves encapsulating the object in a rectilinear box covering the object in the view thereof as seen from the position. The first measure is set equal to a shortest side of the rectilinear box, and the second measure is set equal to a longest side of the rectilinear box.

Determining the first and second measures may involve obtaining position data describing a respective position of each of at least four corners of a cuboid encapsulating the object. More precisely, the corners include a base corner and three corners of the cuboid, which three corners are located on a respective edge directly connected to the base corner. Based on the respective position of each of the at least four corners, each of the corners being visible from the position is projected onto a plane that is orthogonal to a direction of the view. Thus, a planar projection of the cuboid is obtained. Thereafter, a largest diagonal in the planar projection is determined. A cross-measure perpendicular to the largest diagonal is also determined, which cross-measure extends between two opposing sides of the planar projection. The first measure is assigned equal to the cross-measure, and the second measure is assigned equal to the largest diagonal. This strategy provides a relevant selection margin to objects of all shapes and dimensions.

According to another embodiment of this aspect of the invention, the selection margin is assigned such that the zone has a non-zero extension outside of the object along at least one buffer side of the object. This means that the selection margin may extend from less than all sides of the object shown towards said position.

Preferably, each of the at least one buffer side is located on a side of the object, which side extends in a general direction of the largest dimension of the object. In other words, if the object has a general oblong shape, the at least one buffer side is preferably located along one or more of the object's longer sides. Thereby, it is rendered easier for a user to select the object because also a near miss, however within the margin of a buffer side, results in a valid selection. It is less relevant to provide such a selection margin along the object's shorter sides, since in this dimension the object itself is relatively wide, and therefore easier to hit with a selection input.

Specifically, according to another embodiment of this aspect of the invention, the selection margin is therefore assigned such that the zone has a wider extension from a side extending in a general direction of the largest dimension of the object than an extension of the zone from a side extending in a general direction of the shortest dimension of the object as seen from the position.

According to yet another embodiment of this aspect of the invention, the selection margin is defined based on a threshold angle outside of at least one edge of the object in the view thereof as seen from the position. This is advantageous because thereby, for a given view angle towards the scene, a linear relationship is maintained between an object's aspect ratio and the selection margin assigned to the object if the distance between the position and the scene is varied. Consequently, the behavior becomes predictable.

According to still another embodiment of this aspect of the invention, the selection margin is assigned such that an extension of the zone in at least one direction outside of the object depends on the object aspect ratio according to the expression: $E=KR^{-x}$, where E is the extension of the zone in the at least one direction, K is a constant larger than zero, R is the object aspect ratio, smaller than or equal to one (i.e. the smallest dimension compared to the largest ditto), and x is a constant larger than or equal to one. The expression specifies that a relatively large difference between the object's smallest and largest dimensions results in a comparatively wide extension of the zone in the at least one direction outside of the object, and vice versa. The magnitude of this effect can be adjusted by selecting the constants K and x to different values.

According a further embodiment of this aspect of the invention, the user input is produced based on gaze data registered for a subject regarding a display on which the scene is presented as seen from the position, and/or tactile input registered on a display presenting the scene as seen from the position. Thereby, the user interaction can be effected in a reliable and consistent manner.

According to another aspect of the invention, the object is achieved by a computer program product loadable into a non-volatile data carrier being communicatively connected to at least one processor. The computer program product contains software configured to, when the computer program product is run on the at least one processing circuitry, cause the at least one processing circuitry to obtain visualizable data representing a scene including at least one object. The visualizable data describe the scene as seen from a position, for instance represented by a virtual camera position or the location from which an image of the scene was shot. The software is configured to determine a first measure representing an extension of the object in a smallest dimension, and a second measure representing an extension of the object in a largest dimension as seen from the position. Additionally, the software is configured to calculate an object aspect ratio representing a relationship between the first and second measures, and, based on the object aspect ratio, assign a selection margin to the object. The selection margin designates a zone outside of the object within which zone the object is validly selectable for manipulation in addition to an area of the object shown towards a view thereof as seen from the position. The advantages of this computer program product and non-volatile data carrier are apparent from the discussion above with reference to the proposed method.

According to yet another aspect of the invention, the above object is achieved by a processing circuitry for pre-processing visualizable data to be manipulatable in response to user input, which processing circuitry is configured to implement the above-described method. The advantages of this processing circuit are apparent from the discussion above with reference to the proposed method.

According to yet another aspect of the invention, the above object is achieved by a computer-implemented method for manipulating data being visualized on a display. The method involves receiving visualizable data having been pre-processed according to the above-described method. The visualizable data thus represent a scene as seen from a specified position. The scene includes at least one object to which a selection margin is assigned within which selection margin the at least one object is validly selectable for manipulation in addition to an area of the object shown towards a view thereof as seen from the specified position. The method further involves checking if user input has been obtained, which user input expresses manipulation of one of the at least one object in the area of the object shown towards the view thereof as seen from the position, or in the selection margin. If such user input is obtained, manipulation of the object is enabled based on the obtained user input. As a result, a user may interact with the object in a reliable and consistent manner also if the object as such shows a small and/or irregular area towards the view from the specified position.

Further advantages, beneficial features and applications of the present invention will be apparent from the following description and the dependent claims.

BRIEF DESCRIPTION OF THE DRAWINGS

The invention is now to be explained more closely by means of preferred embodiments, which are disclosed as examples, and with reference to the attached drawings.

FIGS. 6a-c illustrate how an object is encapsulated by cuboid in order to assign a selection margin to the object according to one embodiment of the invention.

FIG. 8 illustrates, by means of a flow diagram, the general method according to the invention for pre-processing visualizable data to be manipulatable in response to user input.

DETAILED DESCRIPTION

Figure 1:
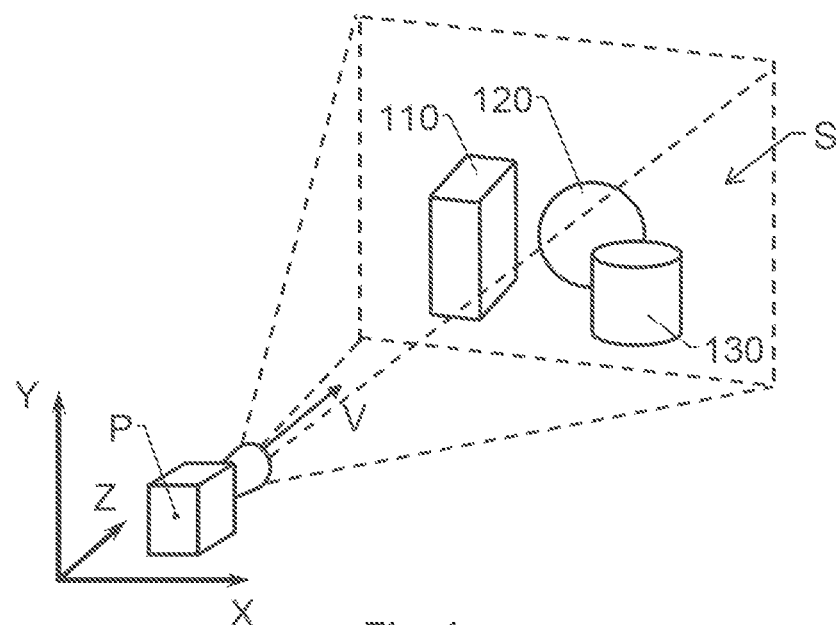
FIG. 1 shows a schematic view of a scene with objects as seen from a specified position.

FIG. 1 shows a schematic view of a scene S with objects 110, 120 and 130 as seen from a specified position P, which is located at a given coordinate in a three-dimensional (3D) coordinate system X, Y, Z relative to the scene S. This means that each of the objects 110, 120 and 130 shows a particular surface area towards a view direction V of the scene S as seen from the position P. If the position P changes; typically, the view direction V of the scene S also changes. As a further result, the objects 110, 120 and 130 show respective surface areas towards the new view direction V of the scene S, which surface areas may be at least slightly different.

Depending on the angle of the view direction V, the shape of and/or the dimensions of an object, the object may show a very small area towards the position P. Consequently, it may be complicated for a user to manipulate the object, for example via a gazed-based selection operation.

Therefore, according to the invention, the visualizable data $D_{in}$ that represent the scene S are pre-processed in at least one processor as will be described below. The visualizable data $Di_n$ describe the scene S as seen from a position P, which may for example be given by the location of a virtual camera in a 3D graphics environment.

Inter alia, the pre-processing of the visualizable data $D_{in}$ according to the invention aims at facilitating gaze-based selection operations in respect of the objects 110, 120 and 130 in the scene S. The gaze-based selection operations rely on gaze data registered for a subject who regards a display on which the scene S is presented as seen from the position P. Additionally, or alternatively, the proposed pre-processing of the visualizable data $D_{in}$ facilitates tactile user input, which is registered on a display presenting the scene S as seen from the position P.

Figure 2:
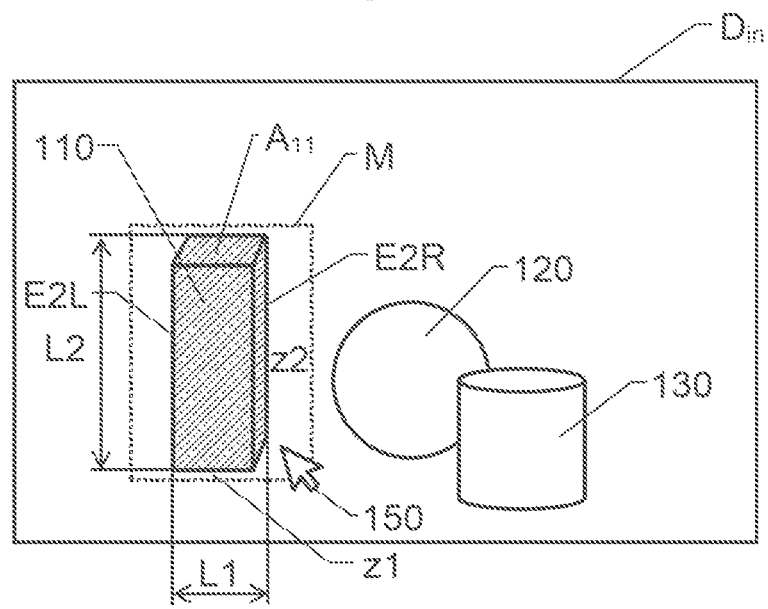
FIG. 2 illustrates visualizable data representing the scene in FIG. 1, where a selection margin is assigned to one of the objects.

Referring now to FIG. 2, we will illustrate how a selection margin M is assigned to one object 110 in the scene S being represented by the visualizable data $D_{in}$.

A first measure L1 is determined, which first measure L1 represents an extension of the object 110 in a smallest dimension as seen from the position P. Here, the first measure L1 is oriented parallel to a first axis X of the 3D coordinate system. A second measure L2 is determined, which second measure L2 represents an extension of the object 110 in a largest dimension as seen from the position P. The second measure L2 is here oriented in parallel with a second axis Y of the 3D coordinate system. Of course, as will be discussed below, the first and second measures L1 and L2 respectively may have any orientation relative to the 3D coordinate system in which the object is located.

An object aspect ratio R is calculated based on the first and second measures L1 and L2. The object aspect ratio R represents a relationship between the first and second measures L1 and L2. In this example, the object aspect ratio R is approximately 1:3 for the object 110.

Based on the object aspect ratio R, a selection margin M is assigned to the object 110. The selection margin M designates a zone outside of the object 110 within which zone the object 110 is validly selectable for manipulation in addition to an area $A_{11}$ of the object 110 shown towards a view V thereof as seen from the position P. Here, the area $A_{11}$ is the size of a planar projection of the object 110 in a plane perpendicular to a direction of the view V.

Preferably, the selection margin M is assigned such that the zone has a wider extension z2 from a side extending in a general direction of the largest dimension of the object 110 (i.e. along L2) than an extension z1 of the zone from a side extending in a general direction of the shortest dimension of the object 110 (i.e. along L1) as seen from the position P. Such a selection margin M renders it easier for a user to select the object 110 because also a near miss, however within the margin M, results in a valid selection of the object 110; and due to the object aspect ratio R, the risk of missing the object 110 is higher near the sides of the object 110 that extend in its largest dimension than any other sides of the object 110.

Figure 3:
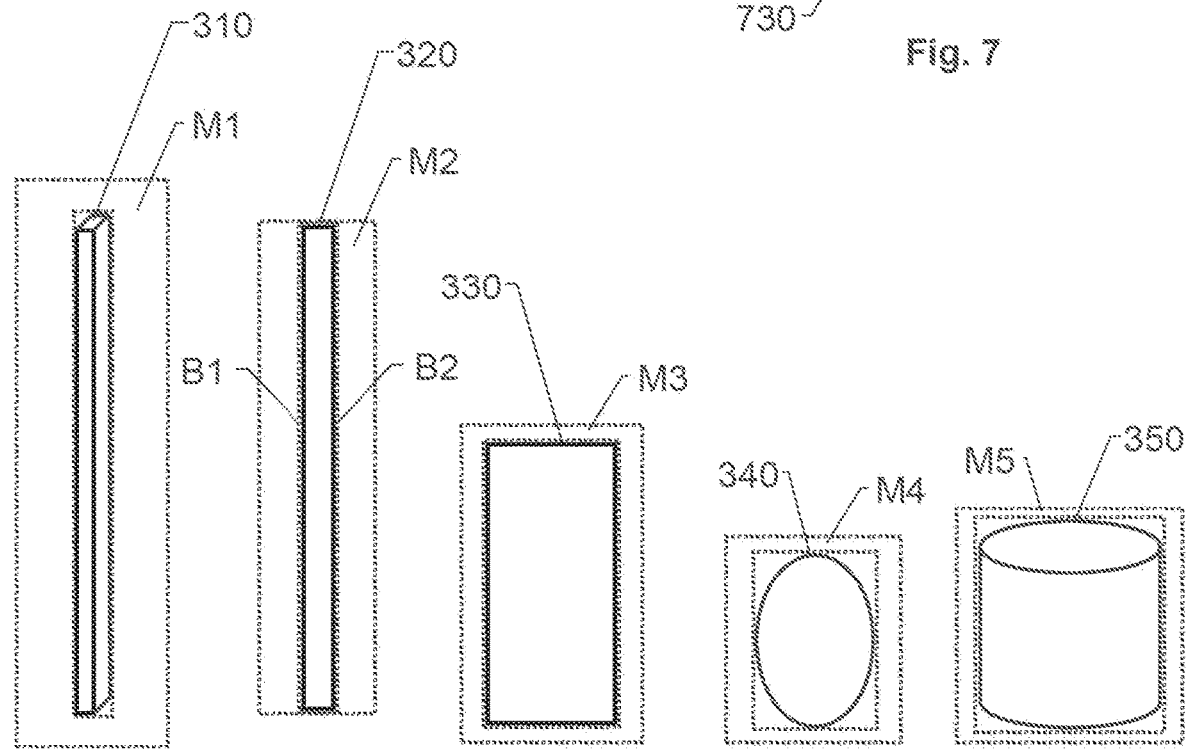

FIG. 3 illustrates how the selection margin M1, M2, M3, M4 and M5 is assigned according to embodiments of the invention. As can be seen, the selection margin is here assigned such that the zone has a wider extension from the object sides that extend in the general direction of the largest dimension of the object. Moreover, the extension of the zone varies depending on the object aspect ratio R, so that for an object aspect ratio R close to one there is a relatively small difference between the extension of the zone along the largest and smallest dimensions; and for an object aspect ratio R far from one, there is a relatively large difference between the extension of the zone along the largest and smallest dimensions.

For example, in FIG. 3, a first object 310 has an object aspect ratio R of 0.068. Here, a selection margin M1 has a widest extension of the zone corresponding to a factor 1.4 times L1 outside of the sides extending in the general direction of the largest dimension of the first object 310 and a narrowest extension of the zone corresponding to a factor 0.80 times L1 outside of the sides extending in the general direction of the smallest dimension of the first object 310.

A second object 320 in FIG. 3 has an object aspect ratio R of 0.071. Here, a selection margin M2 has a widest extension of the zone corresponding to a factor 1.2 times L1 outside of the sides extending in the general direction of the largest dimension of the second object 320 and a narrowest extension of the zone being zero outside of the sides extending in the general direction of the smallest dimension of the second object 320.

A third object 330 in FIG. 3 has an object aspect ratio R of 0.45. Here, a selection margin M3 has a widest extension of the zone corresponding to a factor 0.20 times L1 outside of the sides extending in the general direction of the largest dimension of the third object 330 and a narrowest extension of the zone corresponding to a factor 0.10 times L1 outside of the sides extending in the general direction of the smallest dimension of the third object 330.

A fourth object 340 in FIG. 3 has an object aspect ratio R of 0.68. Here, a selection margin M4 has a widest extension of the zone corresponding to a factor 0.18 times L1 outside of the sides extending in the general direction of the largest dimension of the fourth object 340 and a narrowest extension of the zone corresponding to a factor 0.12 times L1 outside of the sides extending in the general direction of the smallest dimension of the forth object 340.

A fifth object 350 in FIG. 3 has an object aspect ratio R of 0.90. Here, a selection margin M5 has a widest extension of the zone corresponding to a factor 0.11 times L1 outside of the sides extending in the general direction of the largest dimension of the fifth object 350 and a narrowest extension of the zone corresponding to a factor 0.04 times L1 outside of the sides extending in the general direction of the smallest dimension of the fifth object 350.

Thus, as can be seen in FIG. 3, the extension of the selection margin M varies with the object aspect ratio R in such a manner the selection margin M has a relatively small widest extension for objects with an object aspect R close to one, and a relatively large widest extension for objects with object aspect ratios R comparatively far from one. According to one embodiment of the invention, this relationship is expressed as $E=KR^{-x}$.

E is here the extension of the zone in at least one direction outside the object. The extension E may be expressed in terms of a factor of the shortest extension L1, or in terms of an angle as will be discussed below with reference to FIG. 4. K is a constant larger than zero, for example 1. R is the object aspect ratio, smaller 1er than or equal to one, i.e. L1/L2, and x is a constant larger than or equal to one, for example 1.

According to the invention, the selection margin M may be zero, i.e. non-existent, along one or more of an object's sides. However, the selection margin M always has a zone with a non-zero extension outside at least one side of the object. For example, in FIG. 3, the second object 320, which has an object aspect ratio R of 0.071 (i.e. comparatively far from one) is assigned a selection margin M such that the zone has a non-zero extension outside of the second object 320 along a respective buffer side B1 and B2 of the second object 320, which buffer sides extend along the second object's 320 largest dimension L2.

Figure 4:
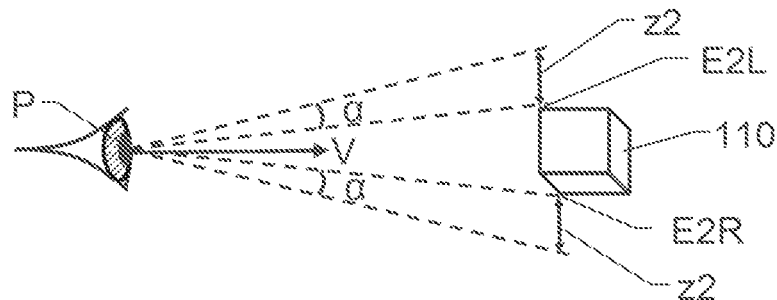
FIGS. 3-5 illustrate how the selection margin is assigned according to embodiments of the invention.

FIG. 4 illustrates how the selection margin M is assigned according to one embodiment of the invention, namely based on a threshold angle α outside of at least one edge E2L and/or E2R of an object 110 in a view V of the object 110 as seen from the position P. FIG. 4 shows a perspective top view of the object 110 in FIGS. 1 and 2. The selection margin M has an extension z2 outside of a left-hand side edge E2L of the object 110. The selection margin M also extends an amount z2 outside of a right-hand side edge E2R of the object 110. The extension z2 is defined based on the threshold angle α outside of the left-hand and right-hand side edges E2L and E2R respectively in the view V of the object 110 as seen from the position P. Thus, the selection margin M creates buffer sides extending along the object's 110 largest dimension L2. Here, due to the object's 110 relatively small object aspect ratio R, the selection margin M only extends a minimal amount z1, for example zero, outside the sides of the object 110 extending along the object's smallest dimension L1.

Figure 5:
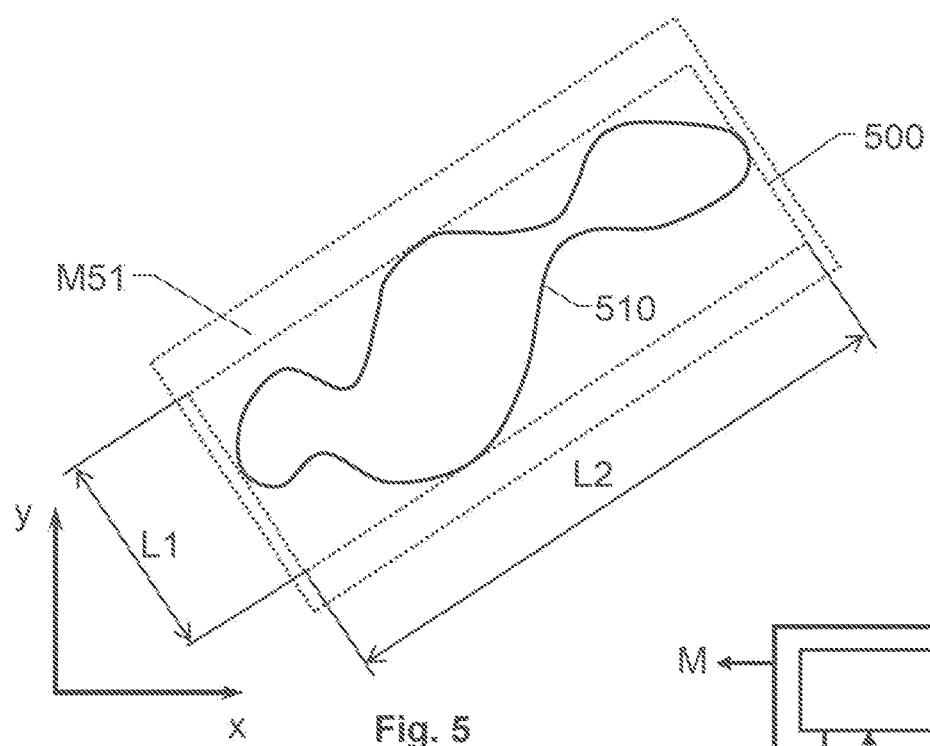

FIG. 5 illustrates how the first and second measures L1 and L2 respectively are determined of according to one embodiment of the invention, which first and second measures L1 and L2, in turn, serve as a basis for assigning the selection margin M51 to an object 510. The procedure involves the following steps. First, the object 510 is encapsulated in a rectilinear box 500 covering the object 510 in the view V thereof as seen from the position P. For example, the rectilinear box 500 may cover the object 510 with minimal margin as illustrated in FIG. 5. Then, the first and second measures L1 and L2 are set equal to a shortest side and a longest side respectively of the rectilinear box 500. In an alternative embodiment of the invention (not shown), the rectilinear box does not fully encapsulate the object 510. Instead, in this embodiment, the rectilinear box may be defined to have approximately the same volume as the object 510. Thus, in case of an irregular object 510 as illustrated in FIG. 5, the rectilinear box will, at least partially, "cut through" the object 510.

In practice, to determine the first and second measures L1 and L2 for an arbitrary object, it may be advantageous to apply the below method. FIGS. 6a to 6c illustrate how an object 610 is encapsulated by cuboid 600 in order to assign a selection margin M6 to the object according to one embodiment of the invention.

The method involves the following steps.

First, position data are obtained, which position data describe a respective position of each of at least four corners C1, C2, C4, and C5 of the cuboid 600 that encapsulates the object 610. The at least four corners include a base corner C1 and three corners of the cuboid 600, which three corners C2, C4 and C5 are located on a respective edge that is directly connected to the base corner C1 and which corners are visible from the position P in the view direction V. In the illustrated example, each of the three corners C2, C4 and C5, is positioned in a direction, seen from the base corner C1, which direction is orthogonal to the other two directions.

Optionally, in a second step, based the at least four corners C1, C2, C4 and C5, a respective position may be derived for each remaining corner C3, C6 and C7 that is visible from the position P in the view direction V. In some cases, the position P is not known when determining the positions of corners of the cuboid 600. Thus, also the corner C8 may be determined.

Third, each of said at least four visible corners C1, C2, C4 and C5 (and possibly any other corner C3, C6 and/or C7 being visible from the position P derived in the second step) is projected onto a plane that is orthogonal to a direction of the view V. Thus, a planar projection PPL of the cuboid 600 is obtained.

Fourth, a largest diagonal DL in the planar projection PPL is determined, which largest diagonal DL, in this example, extends between the corners C1 and C3.

Fifth, a cross-measure CM is determined, which cross measure CM is perpendicular to the largest diagonal DL, and which cross measure CM extends between two opposing sides of the planar projection PPL.

Sixth, the first measure L1 is assigned equal to the cross-measure CM, and the second measure L2 is assigned equal to the largest diagonal DL.

Finally, the selection margin M6 is assigning, based on the object aspect ratio R as described above.

Figure 7:
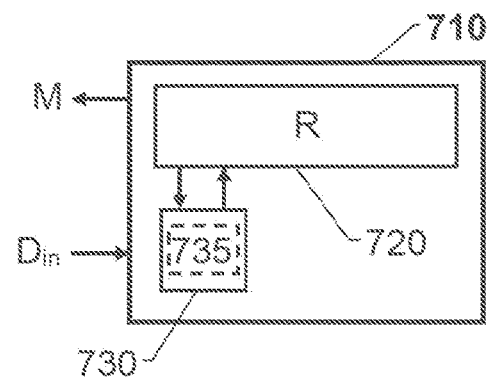
FIG. 7 shows a block diagram of a processing circuitry according to one embodiment of the invention.

FIG. 7 shows a block diagram of a processing circuitry 710 according to one embodiment of the invention. The processing circuitry 710 contains at least one processor 720. The at least one processor 720 is communicatively connected to a non-volatile data carrier 730, which may either be included in the processing circuitry 710, or be located in a component external thereto.

The non-volatile data carrier 730 stores a computer program product 735 containing software configured to, when the computer program product 735 is run on the at least one processing circuitry 720, cause the at least one processing circuitry 720 to carry out the following steps:
  obtain visualizable data $D_{in}$ representing a scene S including at least one object, which visualizable data $D_{in}$ describe the scene S as seen from a position P;
  determine a first measure L1 representing an extension of the object in a smallest dimension as seen from the position P;
  determine a second measure L2 representing an extension of the object in a largest dimension as seen from the position P;
  calculate an object aspect ratio R representing a relationship between the first and second measures L1 and L2; and
  assign, based on the object aspect ratio R, a selection margin M to the object, which selection margin designates a zone outside of the object within which zone the object is validly selectable for manipulation in addition to an area $A_{11}$ of the object shown towards a view V thereof as seen from the position P.

In order to sum up, and with reference to the flow diagram in FIG. 8, we will now describe the general method according to the invention for pre-processing visualizable data to be manipulatable in response to user input, which method is performed in at least one processor.

In a first step 810 visualizable data are obtained, which visualizable data represent a scene as seen from a position P. The scene includes at least one object, for example defined in 3D graphics.

In a step 820 thereafter, a first measure is determined that represents an extension of the at least one object in the scene in a smallest dimension of the object as seen from the position. In step 820, a second measure is also determined that represents an extension of the object in a largest dimension as seen from the position.

A subsequent step 830, calculates an object aspect ratio representing a relationship between the first and second measures, for example as a ration between the first and second measures.

Then, in a step 840, a selection margin is assigned to the object based on the object aspect ratio. The selection margin designates a zone outside of the object within which zone the object is validly selectable for manipulation in addition to an area of the object shown towards a view thereof as seen from the position.

Thereafter, the procedure ends. Naturally, in practice, the procedure is preferably repeated in respect of one or more other objects in the scene. Moreover, in response to a change in the scene and/or an adjustment of the position from which the scene is viewed, it is advantageous to the repeated procedure, preferably with respect to each object in the scene.

All of the process steps, as well as any sub-sequence of steps, described with reference to FIG. 8 above may be controlled by means of at least one programmed processor. Moreover, although the embodiments of the invention described above with reference to the drawings comprise processor and processes performed in at least one processor, the invention thus also extends to computer programs, particularly computer programs on or in a carrier, adapted for putting the invention into practice. The program may be in the form of source code, object code, a code intermediate source and object code such as in partially compiled form, or in any other form suitable for use in the implementation of the process according to the invention. The program may either be a part of an operating system, or be a separate application. The carrier may be any entity or device capable of carrying the program. For example, the carrier may comprise a storage medium, such as a Flash memory, a ROM (Read Only Memory), for example a DVD (Digital Video/Versatile Disk), a CD (Compact Disc) or a semiconductor ROM, an EPROM (Erasable Programmable Read-Only Memory), an EEPROM (Electrically Erasable Programmable Read-Only Memory), or a magnetic recording medium, for example a floppy disc or hard disc. Further, the carrier may be a transmissible carrier such as an electrical or optical signal which may be conveyed via electrical or optical cable or by radio or by other means. When the program is embodied in a signal which may be conveyed directly by a cable or other device or means, the carrier may be constituted by such cable or device or means. Alternatively, the carrier may be an integrated circuit in which the program is embedded, the integrated circuit being adapted for performing, or for use in the performance of, the relevant processes.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments in the figures but may be varied freely within the scope of the claims.

The invention claimed is:

1. A method performed in at least one processor for pre-processing visualizable data to be manipulatable in response to user input, the method comprising the steps of:
    obtaining visualizable data representing a scene including at least one object, the visualizable data describing the scene as seen from a position,
    determining a first measure representing an extension of the object in a smallest dimension, and a second measure representing an extension of the object in a largest dimension as seen from the position,
    calculating an object aspect ratio representing a relationship between the first and second measures, and
    assigning, based on the object aspect ratio, a selection margin to the object, the selection margin designating a zone outside of the object within which zone the object is validly selectable for manipulation in addition to an area of the object shown towards a view thereof as seen from the position.

2. The method according to claim 1, wherein the selection margin is assigned such that the zone has a non-zero extension outside of the object along at least one buffer side of the object.

3. The method according to claim 2, wherein each of the at least one buffer side is located on a side of the object, which side extends in a general direction of the largest dimension of the object.

4. The method according to claim 2, wherein the selection margin is assigned such that the zone has a wider extension from a side extending in a general direction of the largest dimension of the object than an extension of the zone from a side extending in a general direction of the shortest dimension of the object as seen from the position.

5. The method according to claim 1, wherein the selection margin is defined based on a threshold angle outside of at least one edge of the object in the view thereof as seen from the position.

6. The method according to claim 1, wherein, the selection margin is assigned such that an extension of the zone in at least one direction outside of the object depends on the object aspect ratio according to the expression:

$E = KR^{-x}$, where

E is the extension of the zone in the at least one direction,
K is a constant larger than zero,
R is the object aspect ratio, smaller than or equal to one, and
x is a constant larger than or equal to one.

7. The method according to claim 1, wherein the determining of the first and second measures comprises the steps of:
    encapsulating the object in a rectilinear box covering the object in the view thereof as seen from the position,
    setting the first measure equal to a shortest side of the rectilinear box, and
    setting the second measure equal to a longest side of the rectilinear box.

8. The method according to claim 1, wherein determining the first and second measures comprises the steps of:
    obtaining position data describing a respective position of each of at least four corners of a cuboid encapsulating the object,
    projecting, based on the respective position of each of the at least four corners, each of the eight corners being visible from the position onto a plane that is orthogonal to a direction of the view, thus obtaining a planar projection of the cuboid, determining a largest diagonal in the planar projection, determining a cross measure being perpendicular to the largest diagonal, and which cross measure extends between two opposing sides of the planar projection, assigning the first measure equal to the cross measure, and assigning the second measure equal to the largest diagonal.

9. The method according to claim 1, wherein the user input is produced based on at least one of:

gaze data registered for a subject regarding a display on which the scene is presented as seen from the position, and tactile input registered on a display presenting the scene as seen from the position.

10. A computer program product loadable into a non-volatile data carrier communicatively connected to at least one processor, the computer program product comprising software configured to, when the computer program product is run on the at least one processing circuitry, cause the at least one processing circuitry to:

obtain visualizable data representing a scene including at least one object, the visualizable data describing the scene as seen from a position, determine a first measure representing an extension of the object in a smallest dimension, and a second measure representing an extension of the object in a largest dimension as seen from the position, calculate an object aspect ratio representing a relationship between the first and second measures, and assign, based on the object aspect ratio, a selection margin to the object, the selection margin designating a zone outside of the object within which zone the object is validly selectable for manipulation in addition to an area of the object shown towards a view thereof as seen from the position.

11. A non-volatile data carrier containing the computer program product of the claim 10.

12. A processing circuitry for pre-processing visualizable data to be manipulatable in response to user input, the processing circuitry being configured to:

obtain visualizable data representing a scene including at least one object, the visualizable data describing the scene as seen from a position, determine a first measure representing an extension of the object in a smallest dimension, and a second measure representing an extension of the object in a largest dimension as seen from the position, calculate an object aspect ratio representing a relationship between the first and second measures, and assign, based on the object aspect ratio, a selection margin to the object, the selection margin designating a zone outside of the object within which zone the object is validly selectable for manipulation in addition to an area of the object shown towards a view thereof as seen from the position.

13. A computer-implemented method for manipulating data being visualized on a display, the method comprising the steps of:

receiving visualizable data having been pre-processed according to the method of any of the claim 1, the visualizable data thus representing a scene as seen from specified position, and the scene including at least one object to which a selection margin is assigned within which selection margin the at least one object is validly selectable for manipulation in addition to an area of the object shown towards a view thereof as seen from the specified position, checking if user input has been obtained, which user input expresses manipulation of one of the at least one object:
in the area of the object shown towards the view thereof as seen from the position, or
in the selection margin, and if such user input is obtained enabling manipulation of said object based on the obtained user input.

* * * * *